United States Patent
Shin et al.

(10) Patent No.: US 12,378,353 B2
(45) Date of Patent: Aug. 5, 2025

(54) POLYESTER RESIN INCLUDING DIESTER COMPOUND AND ANHYDROSUGAR ALCOHOL, AND METHOD FOR PREPARING SAME

(71) Applicant: SAMYANG CORPORATION, Seoul (KR)

(72) Inventors: Kyung Moo Shin, Daejeon (KR); Jun Seop Im, Hwaseong-si (KR); Hoon Ryu, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 457 days.

(21) Appl. No.: 17/765,486

(22) PCT Filed: Sep. 29, 2020

(86) PCT No.: PCT/KR2020/013318
§ 371 (c)(1),
(2) Date: Mar. 31, 2022

(87) PCT Pub. No.: WO2021/066512
PCT Pub. Date: Apr. 8, 2021

(65) Prior Publication Data
US 2022/0372215 A1 Nov. 24, 2022

(30) Foreign Application Priority Data
Oct. 1, 2019 (KR) .................... 10-2019-0121858

(51) Int. Cl.
*C08G 63/183* (2006.01)
*C08G 63/672* (2006.01)

(52) U.S. Cl.
CPC ......... *C08G 63/183* (2013.01); *C08G 63/672* (2013.01); *C08G 2230/00* (2013.01)

(58) Field of Classification Search
CPC . C08G 63/183; C08G 63/672; C08G 2230/00
USPC ...................................................... 528/308.6
See application file for complete search history.

(56) References Cited

U.S. PATENT DOCUMENTS

| | | | |
|---|---|---|---|
| 6,063,464 A * | 5/2000 | Charbonneau | C08G 63/668 428/364 |
| 9,290,615 B2 | 3/2016 | Tamura et al. | |
| 2002/0115817 A1* | 8/2002 | Hayes | C08J 5/18 428/221 |
| 2003/0204029 A1* | 10/2003 | Brandenburg | C08G 63/668 525/444 |
| 2003/0212244 A1* | 11/2003 | Hayes | C08G 65/405 528/298 |
| 2012/0177854 A1* | 7/2012 | Lee | C08G 63/78 428/35.7 |
| 2012/0220676 A1* | 8/2012 | Moens | C09D 167/025 521/48.5 |
| 2014/0018484 A1* | 1/2014 | Kim | C09D 167/02 524/391 |
| 2017/0144420 A1* | 5/2017 | Lim | B32B 27/36 |

FOREIGN PATENT DOCUMENTS

| | | |
|---|---|---|
| JP | 2007-112820 A | 5/2007 |
| JP | 2017-115150 A | 6/2017 |
| KR | 10-1994-0018411 A | 8/1994 |
| KR | 10-1079518 B1 | 11/2011 |
| KR | 10-2012-0066904 A | 6/2012 |
| KR | 10-2015-0117954 A | 10/2015 |
| KR | 10-2019-0107562 A | 9/2019 |

OTHER PUBLICATIONS

F. Fenouillot et al. "Polymers from renewable 1,4:3,6-dianhydrohexitols (isosorbide, isomannide and isoidide): A review", Progress in Polymer Science 35 (2010) 578-622 (Year: 2010).*
TH. Rieckmann et al "Poly(Ethylene Terephthalate) Polymerization—Mechanism, Catalysis, Kinetics, Mass Transfer and Reactor Design", Modern Polyesters: Chemistry and Technology of Polyesters and Copolyesters, Chapter II, 2003 John Wiley & Sons (Year: 2003).*
W. Borman "Molecular Weight-Viscosity Relationships for Poly ( 1,4- butylene Terephthalate)", Journal of Applied Polymer Science, vol. 22, 2119-2126 (1978) (Year: 1978).*
International Search Report, issued in PCT/KR2020/013318, mailed Jan. 13, 2021.

* cited by examiner

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

The polyester resin is described, which has repeating units derived from a diester component of a dicarboxylic acid; and a diol component. The diester of the aliphatic dicarboxylic acid includes a succinic acid diester, the diol component comprises 50 to 100 mol % of an anhydrosugar alcohol, based on 100 mol % of the total diol component, and the number average molecular weight (Mn) of the polyester resin is 10,000 g/mol or more. A method for preparing a polyester resin comprises (1) esterification or transesterification of a diester component of a dicarboxylic acid comprising a diester of an aliphatic dicarboxylic acid and a diester of an aromatic dicarboxylic acid and a diol component comprising an anhydrosugar alcohol; and (2) polycondensation of the reaction product obtained in step (1). The polyester resin has excellent heat resistance and mechanical properties and also has excellent biodegradability.

11 Claims, No Drawings

POLYESTER RESIN INCLUDING DIESTER COMPOUND AND ANHYDROSUGAR ALCOHOL, AND METHOD FOR PREPARING SAME

TECHNICAL FIELD

The present invention relates to a polyester resin comprising diester compound and anhydrosugar alcohol and a method for preparing the same, and more specifically, to a polyester resin having excellent heat resistance and mechanical properties as well as excellent biodegradability by copolymerizing a diester component comprising a succinic acid diester compound and a diol component comprising anhydrosugar alcohol in a specific amount and a method for preparing the same.

BACKGROUND ART

Hydrogenated sugar (also known as "sugar alcohol") refers to a compound obtained by adding hydrogen to the reducing terminal group of a saccharide. Generally, it has the formula $HOCH_2(CHOH)_nCH_2OH$ (wherein n is an integer of 2 to 5) and is classified into tetritol, pentitol, hexitol and heptitol (having 4, 5, 6 and 7 carbon atoms, respectively) depending on the number of carbon atoms. Among them, hexitol having 6 carbon atoms includes sorbitol, mannitol, iditol, galactitol and the like, and sorbitol and mannitol are particularly useful substances.

Anhydrosugar alcohol has a diol form with two hydroxyl groups in the molecule and can be prepared by utilizing hexitol derived from starch (for instance, Korean Patent No. 10-1079518 and Korean Patent Laid-open Publication No. 10-2012-0066904). Since anhydrosugar alcohol is an eco-friendly substance derived from renewable natural resources, there has been much interest for a long time, and studies on the production method have been carried out. Among these anhydrosugar alcohols, isosorbide prepared from sorbitol presently has the largest industrial application range.

Anhydrosugar alcohol is widely used in the treatment of cardiac and vascular diseases, adhesives for patches, drugs for mouthwash and the like, solvents for compositions in the cosmetics industry and emulsifiers in the food industry. In addition, it is possible to increase the glass transition temperature of a polymer such as polyester, PET, polycarbonate, polyurethane and epoxy resin, and to improve the strength of these materials, and it is also very useful in the plastics industry such as bioplastics since it is an eco-friendly material derived from natural materials. It is also known to be used as adhesives, eco-friendly plasticizers, biodegradable polymers and an eco-friendly solvent for water-soluble lacquers.

As such, anhydrosugar alcohol has attracted a great deal of attention due to its versatility, and its use in industry is increasing.

Meanwhile, efforts are being made to reduce the use of fossil resources in order to cope with their depletion, the increase of carbon dioxide in the atmosphere due to the mass consumption of petroleum resources and the global warming problem. In this regard, interest in environmentally circulating polymers is high, and studies on polyester resins using biomass raw materials such as anhydrosugar alcohol are being actively conducted.

Aliphatic polyester resins using biomass raw materials are widely used in fields such as packaging materials, molded products, and films, and are one of the eco-friendly plastics that do not contain environmental hormones. In addition, by having biodegradability, they are attracting attention as eco-friendly materials that can solve the problem of environmental pollution caused by waste plastic, which has recently become an issue.

In recent years, in polycarbonate mainly used for heat-resistant food containers, as the harmfulness of bisphenol A has been revealed, the need for a polyester resin that is environmentally friendly, has transparency and heat resistance is increasing.

In the case of a conventional homopolyester composed of terephthalic acid and ethylene glycol, mechanical properties and heat resistance can be improved to some extent through crystallization by stretching and heat fixation, but there is a limit to the application use and improvement of heat resistance. Therefore, in recent years, a method of improving the heat resistance of the polyester resin has been developed by using isosorbide, which is a biomass-derived compound derived from starch, as a comonomer of a polyester resin. However, since isosorbide is a secondary alcohol which has low reactivity, it is known that is difficult to form a polyester resin having a high viscosity used in the manufacture of sheets or bottles.

Accordingly, there is an urgent need to develop a polyester resin that is environmentally friendly, has a high molecular weight and can simultaneously exhibit excellent heat resistance and mechanical properties.

CONTENTS OF THE INVENTION

Problems to be Solved

The purpose of the present invention is to provide a polyester resin having excellent heat resistance and mechanical properties as well as excellent biodegradability by copolymerizing a diester component comprising a succinic acid diester compound and a diol component comprising anhydrosugar alcohol in a specific amount and a method for preparing the same.

Technical Means

In order to achieve the technical purpose, in the first aspect, the present invention provides a polyester resin comprising a repeating unit derived from a diester component of a dicarboxylic acid; and a repeating unit derived from a diol component, wherein the diester component of the dicarboxylic acid comprises 0.1 to 14.5 mol % of a diester of an aliphatic dicarboxylic acid; and 85.5 to 99.9 mol % of a diester of an aromatic dicarboxylic acid, based on 100 mol % of the total diester component of the dicarboxylic acid, the diester of the aliphatic dicarboxylic acid comprises a succinic acid diester, the diol component comprises 50 to 100 mol % of an anhydrosugar alcohol, based on 100 mol % of the total diol component, and the number average molecular weight (Mn) of the polyester resin is 10,000 g/mol or more.

In the second aspect, the present invention provides a method for preparing a polyester resin comprising (1) a step of esterification reaction or transesterification reaction of a diester component of a dicarboxylic acid comprising a diester of an aliphatic dicarboxylic acid and a diester of an aromatic dicarboxylic acid and a diol component comprising an anhydrosugar alcohol; and (2) a step of polycondensation reaction of the reaction product obtained in step (1), wherein the diester of the aliphatic dicarboxylic acid comprises a succinic acid diester, the diester component of the dicarboxylic acid comprises 0.1 to 14.5 mol % of the diester of the aliphatic dicarboxylic acid; and 85.5 to 99.9 mol % of the diester of the aromatic dicarboxylic acid, based on 100 mol % of the total diester component of the dicarboxylic acid, the diol component comprises 50 to 100 mol % of an anhydrosugar alcohol, based on 100 mol % of the total diol component, and the number average molecular weight (Mn) of the polyester resin is 10,000 g/mol or more.

Effect of the Invention

The polyester resin according to the present invention is prepared by using an anhydrosugar alcohol and a diester of an aliphatic dicarboxylic acid comprising a succinic acid diester compound which are biomass-derived compounds, so that it is environmentally friendly, can exhibit excellent heat resistance and mechanical properties (especially impact strength) at the same time and have a high molecular weight.

CONCRETE MODE FOR CARRYING OUT THE INVENTION

The present invention is explained in more detail below.

The polyester resin of the present invention comprises a repeating unit derived from a diester component of a dicarboxylic acid; and a repeating unit derived from a diol component, wherein the diester component of the dicarboxylic acid comprises 0.1 to 14.5 mol % of a diester of an aliphatic dicarboxylic acid; and 85.5 to 99.9 mol % of a diester of an aromatic dicarboxylic acid, based on 100 mol % of the total diester component of the dicarboxylic acid, the diester of the aliphatic dicarboxylic acid comprises a succinic acid diester, the diol component comprises 50 to 100 mol % of an anhydrosugar alcohol, based on 100 mol % of the total diol component, and the number average molecular weight (Mn) of the polyester resin is 10,000 g/mol or more.

Although not particularly limited, in one embodiment, the polyester resin of the present invention may comprise a structure represented by the following Formula 1:

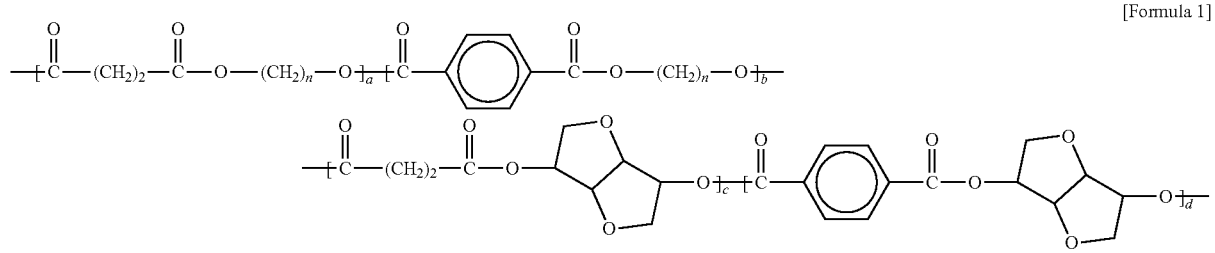

[Formula 1]

in Formula 1,
n is an integer of 2 to 15, preferably 2 to 10,
a is an integer of 0 to 50, preferably 5 to 10,
b is an integer of 0 to 200, preferably 5 to 20,
c is an integer of 1 to 100, preferably 10 to 30,
d is an integer of 10 to 300, preferably 50 to 100.

The diester component used in the preparation of the polyester resin according to the present invention comprises a diester component of an aliphatic dicarboxylic acid and a diester component of an aromatic dicarboxylic acid, and the diester of the aliphatic dicarboxylic acid comprises a succinic acid diester (e.g., dimethyl succinate, diethyl succinate, etc.).

The diester component of the aliphatic dicarboxylic acid may further comprise a diester of an aliphatic dicarboxylic acid having 4 to 14 carbon atoms other than a succinic acid diester, and the diester component of the aliphatic dicarboxylic acids other than the succinic acid diester may comprise one or two or more diester components of the linear, branched or cyclic aliphatic dicarboxylic acids commonly used in the production of polyester resins, such as cyclohexanedicarboxylic acid diesters such as 1,4-cyclohexanedicarboxylic acid diester and 1,3-cyclohexanedicarboxylic acid diester; sebacic acid diester; isodecylsuccinic acid diester; maleic acid diester; fumaric acid diester; adipic acid diester; glutaric acid diester; azelaic acid diester; itaconic acid diester; glutamic acid diester; 2,5-furandicarboxylic acid diester; tetrahydrofuran-2,5-dicarboxylic acid diester; tetrahydrofuran-3,5-dicarboxylic acid diester; undecanedioic acid diester; dodecanedioic acid diester; tridecanedioic acid diester and tetradecanedioic acid diester, etc.

In the polyester resin of the present invention, the content of the diester component of the aliphatic dicarboxylic acid may be 0.1 mol % or more, 0.3 mol % or more, 0.5 mol % or more, 0.8 mol % or more, 1 mol % or more, 1.5 mol % or more, 2 mol % or more, 3 mol % or more, 5 mol % or more, 7 mol % or more, or 10 mol % or more, and may be 14.5 mol % or less, 14.2 mol % or less, 14 mol % or less, 13.5 mol % or less, 13 mol % or less, 12 mol % or less, 10 mol % or less, 8 mol % or less, 7 mol % or less, or 5 mol % or less—for example, 0.1 to 14.5 mol %, 1 to 14 mol %, 5 to 12 mol % or 5 to 10 mol %, based on 100 mol % of the total diester component. If the content of the diester component of the aliphatic dicarboxylic acid is less than the above level, impact strength of the polyester resin is lowered and the biodegradability is lowered, so that it may be difficult to apply the polyester resin as an eco-friendly product, and if the content is more than the above level, the heat resistance of the polyester resin may decrease.

The diester component of the aromatic dicarboxylic acid may comprise, specifically, a diester of an aromatic dicarboxylic acid having 8 to 16 carbon atoms—for example, it may comprise one or two or more diester components of the aromatic dicarboxylic acid commonly used in the production of polyester resins, such as phthalic acid diester, terephthalic acid diester, isophthalic acid diester, 2,6-naphthalenedicarboxylic acid diester, diphenic acid diester, p-phenylene diacetic acid diester and o-phenylene diacetic acid diester, preferably terephthalic acid diester (e.g., dimethyl terephthalate, diethyl terephthalate, etc.).

The content of the diester component of the aromatic dicarboxylic acid may be 85.5 mol % or more, 86 mol % or more, 88 mol % or more, 90 mol % or more, 92 mol % or more, 93 mol % or more, or 95 mol % or more, and may be 99.9 mol % or less, 99 mol % or less, 98.5 mol % or less, 98 mol % or less, 95 mol % or less, 93 mol % or less, 90 mol % or less, or 88 mol % or less—for example, 85.5 to 99.9 mol %, 86 to 99 mol %, 88 to 95 mol % or 90 to 95 mol %, based on 100 mol % of the total diester component. If the content of the diester component of the aromatic dicarboxylic acid is less than the above level, the heat resistance of the polyester resin is lowered, and if the content is more than the above level, the impact strength of the polyester resin is lowered and the biodegradability is lowered, so that it may be difficult to apply the polyester resin as an eco-friendly product.

The diol component used to prepare the polyester resin of the present invention may comprise 50 to 100 mol % of anhydrosugar alcohol based on 100 mol % of the total diol component.

The anhydrosugar alcohol is any substance obtained by removing one or more water molecules from a compound obtained by adding hydrogen to the reducing terminal group of a saccharide, generally called hydrogenated sugar or sugar alcohol.

In the present invention, as the anhydrosugar alcohol, dianhydrohexitol, which is a dehydrate of hexitol, can be preferably used, and more preferably, the anhydrosugar alcohol may be selected from the group consisting of isosorbide (1,4:3,6-dianhydroisorbitol), isomannide (1,4:3,6-dianhydromannitol), isoidide (1,4:3,6-dianhydroiditol) or mixtures thereof, and most preferably isosorbide may be used.

The content of the anhydrosugar alcohol component may be 50 mol % or more, 55 mol % or more, 60 mol % or more, 70 mol % or more, 75 mol % or more, 80 mol % or more, 85 mol % or more, or 90 mol % or more, and may be 100 mol % or less, 95 mol % or less, 90 mol % or less, 85 mol % or less, 80 mol % or less, 75 mol % or less, or 70 mol % or less—for example 50 to 100 mol %, 70 to 100 mol % or 90 to 100 mol %, based on 100 mol % of the total diol component. If the content of the anhydrosugar alcohol is less than the above level, the heat resistance of the polyester resin is lowered, and the content of the biomass-derived component is lowered, so that it may be difficult to apply the polyester resin as an eco-friendly product.

The diol component used in the present invention may further comprise an aliphatic diol component other than anhydrosugar alcohol, specifically, an aliphatic diol having 2 to 15 carbon atoms, more specifically an aliphatic diol having 2 to 10 carbon atoms—for example, it may be selected from the group consisting of ethylene glycol, diethylene glycol, triethylene glycol, propane diol (1,2-propane diol and 1,3-propane diol, etc.), butane diol (1,2-butane diol, 1,3-butane diol and 1,4-butane diol, etc.), pentane diol (1,2-pentane diol, 1,3-pentane diol, 1,4-pentane diol and 1,5-pentane diol, etc.), hexane diol (1,2-hexane diol, 1,3-hexane diol, 1,4-hexane diol, 1,5-hexane diol and 1,6-hexane diol, etc.), neopentyl glycol, cyclohexane diol (1,2-cyclohexane diol, 1,3-cyclohexane diol and 1,4-cyclohexane diol, etc.), cyclohexane dimethanol (1,2-cyclohexane dimethanol, 1,3-cyclohexane dimethanol and 1,4-cyclohexane dimethanol, etc.), tetramethylcyclobutane diol, tricyclodecane dimethanol, adamantanediol, 2,2-dimethyl-1,3-propane diol, 2-ethyl-2-t-butyl-1,3-propane diol, 2,2,4-trimethyl-1,6-hexane diol or combinations thereof, preferably butane diol.

The content of aliphatic diols other than the anhydrosugar alcohol may be more than 0 mol %, 5 mol % or more, 9 mol % or more, 10 mol % or more, 15 mol % or more, 20 mol % or more, 22 mol % or more, 25 mol % or more, 30 mol% or more or 35 mol % or more, and may be 50 mol % or less, 45 mol % or less, 40 mol % or less, 35 mol % or less, 30 mol % or less, 25 mol % or less, or 20 mol % or less—for example, more than 0 mol % to 50 mol % or less, more than 0 mol % to 30 mol % or less or more than 0 mol % to 10 mol % or less, based on 100 mol % of the total diol component. By using aliphatic diols other than the anhydrosugar alcohol at the above level, the polyester resin can maintain excellent heat resistance, and it is easy to apply it as an eco-friendly product as the content of the biomass-derived component increases, and in particular, the impact strength can be further improved.

In the polyester resin according to the present invention, the content of the raw material component derived from biomass comprising an anhydrosugar alcohol and a diester component of an aliphatic dicarboxylic acid (e.g., succinic acid diester, etc.) may be 28 to 70% by weight, 29 to 65% by weight or 40 to 60% by weight, based on the total weight of the monomers constituting the polyester resin. If the content of the raw material component derived from biomass is less than the above level, it may be difficult to apply the polyester resin as an eco-friendly product.

The polyester resin of the present invention may have a number average molecular weight (Mn: g/mol) of 10,000 or more, 15,000 or more, or 20,000 or more—for example, 10,000 to 100,000, 15,000 to 50,000 or 20,000 to 50,000, as measured by gel permeation chromatography (GPC). If the number average molecular weight is less than 10,000, mechanical properties (e.g., impact strength, etc.) of the polyester resin may be poor.

In another aspect, the present invention provides a method for preparing a polyester resin comprising (1) a step of esterification reaction or transesterification reaction of a diester component of a dicarboxylic acid comprising a diester of an aliphatic dicarboxylic acid and a diester of an aromatic dicarboxylic acid and a diol component comprising an anhydrosugar alcohol; and (2) a step of polycondensation reaction of the reaction product obtained in step (1), wherein the diester of the aliphatic dicarboxylic acid comprises a succinic acid diester, the diester component of the dicarboxylic acid comprises 0.1 to 14.5 mol % of the diester of the aliphatic dicarboxylic acid; and 85.5 to 99.9 mol % of the diester of the aromatic dicarboxylic acid, based on 100 mol % of the total diester component of the dicarboxylic acid, the diol component comprises 50 to 100 mol % of an anhydrosugar alcohol, based on 100 mol % of the total diol component, and the number average molecular weight (Mn) of the polyester resin is 10,000 g/mol or more.

The diol component comprising the anhydrosugar alcohol and the diester component of dicarboxylic acid used in the method of the present invention may be the same as those of the above-described components. In addition, the diol component may further comprise an aliphatic diol component other than anhydrosugar alcohol.

In the method for preparing a polyester resin of the present invention, (1) a step of esterification reaction or transesterification reaction of a diester component of a dicarboxylic acid comprising a diester of an aliphatic dicarboxylic acid and a diester of an aromatic dicarboxylic acid and a diol component comprising an anhydrosugar alcohol is conducted. The esterification reaction or transesterification reaction can be conducted by adding the diol component and the diester component of the dicarboxylic acid so that the reaction molar ratio of the diol component to the diester component of the dicarboxylic acid (the total number of moles of the diol component/the total number of moles of the diester component of the dicarboxylic acid) is 1 to 1.5 under conditions of the temperature of 150 to 250° C., preferably 200 to 250° C., more preferably 200 to 240° C., and the pressure of 0.1 to 3.0 kgf/cm², preferably 0.2 to 2.0 kgf/cm².

If the reaction molar ratio of the diol component to the diester component of the dicarboxylic acid (total moles of the diol component/total moles of the diester component of the dicarboxylic acid) is less than 1, the unreacted diester component during the polymerization reaction remains and there is a concern that the mechanical properties and color of the polyester resin may be deteriorated, and if the ratio exceeds 1.5, the polymerization reaction rate is too slow, and the productivity of the polyester resin may be lowered.

The esterification reaction time or transesterification reaction time is usually 1 to 5 hours, preferably about 2 to 3 hours, and may vary depending on the reaction temperature and pressure and the reaction molar ratio of the diol component to the diester component.

In the method for preparing a polyester resin of the present invention, a catalyst is not required for the esterification reaction or the transesterification reaction (step (1)), but a catalyst may be used to shorten the reaction time. The esterification reaction or transesterification reaction (step (1)) may be conducted in a batch or continuous manner, and each reaction raw material may be added separately.

In the method for preparing a polyester resin of the present invention, step (2) of a polycondensation reaction of the reaction product obtained in step (1) may be conducted after the esterification reaction or transesterification reaction in step (1).

Prior to initiation of the polycondensation reaction, a polycondensation catalyst, a stabilizer or the like may be added to the reaction product of the esterification reaction or transesterification reaction. A polycondensation catalyst commonly used in this field may be used without limitation may be used—for example, one or a mixture of two or more selected from a titanium-based compound, a germanium-based compound, an antimony-based compound, an aluminum-based compound and a tin-based compound. As the stabilizer added to the polycondensation reaction, a phosphorus-based compound may be generally used—for example, phosphoric acid, trimethyl phosphate, triethyl phosphate or a mixture thereof.

The polycondensation reaction is conducted at a temperature of 200 to 300° C., preferably 250 to 290° C. and more preferably 260 to 280° C., and a reduced pressure condition of 500 to 0.1 mmHg. The reduced pressure conditions are for removing by-products of the poly condensation reaction.

In one embodiment, (a) the esterification reaction or transesterification reaction may be conducted with a polymerization reactant comprising (i) a diester component comprising a succinic acid diester compound and, if necessary, another aromatic diester component and an aliphatic diester component other than succinic acid diester; and (ii) dianhydrohexitol and, if necessary, other diol components, at a pressure of 0.1 to 3.0 kgf/cm² and a temperature of 150 to 250° C. for an average residence time of 1 to 5 hours. (b) Then, by conducting a polycondensation reaction of the esterification or transesterification reaction product under reduced pressure conditions of 500 to 0.1 mmHg and at a temperature of 200 to 300° C. for an average residence time of 1 to 10 hours, the polyester resin of the present invention can be prepared. Preferably, the final vacuum degree of the polycondensation reaction is less than 1.0 mmHg, and the esterification or transesterification reaction may be conducted under an inert gas atmosphere.

When the number average molecular weight of the polyester resin prepared according to the method of the present invention was measured by gel permeation chromatography (GPC) (standard: polystyrene), the number average molecular weight (Mn: g/mol) may be 10,000 or more, 15,000 or more or 20,000 or more, and may be 100,000 or less, 70,000 or less, or 50,000 or less, and specifically 10,000 to 100,000, 15,000 to 70,000 or 20,000 to 50,000.

Since the polyester resin of the present invention has excellent heat resistance and impact strength and excellent color, it can be molded to be useful as a film, sheet, beverage bottle, baby bottle, fiber or optical product.

The present invention is explained in more detail through the following Examples and Comparative Examples. However, the scope of the present invention is not limited thereby in any manner.

EXAMPLES

Example 1: Preparation of poly(isosorbide succinate-co-isosorbide terephthalate)

In a 500 mL 3-neck flask, 0.3g (2 mmol) of dimethyl succinate, 3.5 g (18 mmol) of dimethyl terephthalate and 3.2 g (22 mmol) of isosorbide were added, and 300 ppm of a titanium-based catalyst and 100 ppm of a phosphate-based stabilizer were added. Then, the temperature was raised to 200° C. to proceed with the esterification reaction. When 80% of methanol, a by-product, flowed out of the system, the polycondensation reaction proceeded, and the polymerization was terminated when the viscosity increase stopped. The number average molecular weight, impact strength and heat resistance (Tg) of the prepared polyester resin were measured and shown in Table 1 below.

Example 2: Preparation of poly(isosorbide succinate-co-isosorbide terephthalate)

Except that the content of dimethyl succinate was changed from 0.3 g (2 mmol) to 0.15 g (1 mmol), and the content of dimethyl terephthalate was changed from 3.5 g (18 mmol) to 3.7 g (19 mmol), a polyester resin was prepared in the same manner as in Example 1, and the number average molecular weight, impact strength and heat resistance (Tg) of the prepared polyester resin were measured and shown in Table 1 below.

Example 3: Preparation of poly(isosorbide succinate-co-butylene succinate-co-isosorbide terephthalate-co-butylene terephthalate)

Except that the content of dimethyl succinate was changed from 0.3 g (2 mmol) to 0.15 g (1 mmol), the content of dimethyl terephthalate was changed from 3.5 g (18 mmol) to 3.7 g (19 mmol), the content of isosorbide was changed from 3.2 g (22 mmol) to 2.4 g (17 mmol) and 0.5 g (5 mmol)of 1,4-butanediol was additionally used, a polyester resin was prepared in the same manner as in Example 1, and the number average molecular weight, impact strength and heat resistance (Tg) of the prepared polyester resin were measured and shown in Table 1 below.

Example 4: Preparation of poly(isosorbide succinate-co-butylene succinate-co-isosorbide terephthalate-co-butylene terephthalate)

Except that the content of dimethyl succinate was changed from 0.3 g (2 mmol) to 0.15 g (1 mmol), the content of dimethyl terephthalate was changed from 3.5 g (18 mmol)

to 3.7 g (19 mmol), the content of isosorbide was changed from 3.2 g (22 mmol) to 2.8 g (20 mmol) and 0.2 g (2 mmol) of 1,4-butanediol was additionally used, a polyester resin was prepared in the same manner as in Example 1, and the number average molecular weight, impact strength and heat resistance (Tg) of the prepared polyester resin were measured and shown in Table 1 below.

Example 5: Preparation of poly(isosorbide succinate-co-isosorbide terephthalate)

Except that the content of dimethyl succinate was changed from 0.3 g (2 mmol) to 0.41 g (2.8 mmol) and the content of dimethyl terephthalate was changed from 3.5 g (18 mmol) to 3.34 g (17.2 mmol), a polyester resin was prepared in the same manner as in Example 1, and the number average molecular weight, impact strength and heat resistance (Tg) of the prepared polyester resin were measured and shown in Table 1 below.

Example 6: Preparation of poly(isosorbide succinate-co-isosorbide terephthalate)

Except that the content of dimethyl succinate was changed from 0.3 g (2 mmol) to 0.03 g (0.2 mmol), and the content of dimethyl terephthalate was changed from 3.5 g (18 mmol) to 3.84 g (19.8 mmol), a polyester resin was prepared in the same manner as in Example 1, and the number average molecular weight, impact strength and heat resistance (Tg) of the prepared polyester resin were measured and shown in Table 1 below.

Example 7: Preparation of poly(isosorbide succinate-co-butylene succinate-co-isosorbide terephthalate-co-butylene terephthalate)

Except that the content of isosorbide was changed from 3.2 g (22 mmol) to 1.6 g (11 mmol), and 1.0 g (11 mmol) of 1,4-butanediol was additionally used, a polyester resin was prepared in the same manner as in Example 1, and the number average molecular weight, impact strength and heat resistance (Tg) of the prepared polyester resin were measured and shown in Table 1 below.

Comparative Example 1: Preparation of poly(isosorbide succinate)

In a 500 mL 3-neck flask, 2.4 g (20 mmol) of succinic acid and 3.2 g (22 mmol) of isosorbide were added, and 300 ppm of a titanium-based catalyst and 100 ppm of a phosphate-based stabilizer were added. Then, the temperature was raised to 200° C. to proceed with the esterification reaction. When 80% of water, a by-product, flowed out of the system, the polycondensation reaction proceeded, and the polymerization was terminated when the viscosity increase stopped. The number average molecular weight, impact strength and heat resistance (Tg) of the prepared polyester resin were measured and shown in Table 1 below.

Comparative Example 2: Preparation of poly(isosorbide succinate)

Except that 3.0 g (20 mmol) of dimethyl succinate was used instead of succinic acid and methanol rather than water was generated as a by-product, a polyester resin was prepared in the same manner as in Comparative Example 1, and the number average molecular weight, impact strength and heat resistance (Tg) of the prepared polyester resin were measured and shown in Table 1 below.

Comparative Example 3: Preparation of poly(isosorbide terephthalate)

Except that 3.9 g (20 mmol) of dimethyl terephthalate was used instead of succinic acid and methanol rather than water was generated as a by-product, a polyester resin was prepared in the same manner as in Comparative Example 1, and the number average molecular weight, impact strength and heat resistance (Tg) of the prepared polyester resin were measured and shown in Table 1 below.

Comparative Example 4: Preparation of poly(isosorbide succinate-co-isosorbide terephthalate)

Except that the content of succinic acid was changed from 2.4 g (20 mmol) to 0.5 g (4 mmol), and 2.7 g (16 mmol) of terephthalic acid was additionally used, a polyester resin was prepared in the same manner as in Comparative Example 1, and the number average molecular weight, impact strength and heat resistance (Tg) of the prepared polyester resin were measured and shown in Table 1 below.

Comparative Example 5: Preparation of poly(isosorbide succinate-co-isosorbide terephthalate)

Except that 0.6 g (4 mmol) of dimethyl succinate and 3.1 g (16 mmol) of dimethyl terephthalate were used instead of succinic acid and methanol rather than water was generated as a by-product, a polyester resin was prepared in the same manner as in Comparative Example 1, and the number average molecular weight, impact strength and heat resistance (Tg) of the prepared polyester resin were measured and shown in Table 1 below.

Comparative Example 6: Preparation of poly(isosorbide succinate-co-isosorbide terephthalate)

Except that 0.45 g (3 mmol) of dimethyl succinate and 3.3 g (17 mmol) of dimethyl terephthalate were used instead of succinic acid and methanol rather than water was generated as a by-product, a polyester resin was prepared in the same manner as in Comparative Example 1, and the number average molecular weight, impact strength and heat resistance (Tg) of the prepared polyester resin were measured and shown in Table 1 below.

Comparative Example 7: Preparation of poly(isosorbide succinate-co-butylene succinate-co-isosorbide terephthalate-co-butylene terephthalate)

Except that 0.3 g (2 mmol) of dimethyl succinate and 3.5 g (18 mmol) of dimethyl terephthalate were used instead of succinic acid, the content of isosorbide was changed from 3.2 g (22 mmol) to 1.45 g (9.9 mmol), 1.09 g (12.1 mmol) of 1,4-butanediol was additionally used and methanol rather than water was generated as a by-product, a polyester resin was prepared in the same manner as in Comparative Example 1, and the number average molecular weight, impact strength and heat resistance (Tg) of the prepared polyester resin were measured and shown in Table 1 below.

Comparative Example 8: Preparation of poly(isosorbide succinate-co-butylene succinate-co-isosorbide terephthalate-co-butylene terephthalate)

Except that 0.15 g (1 mmol) of dimethyl succinate and 3.7 g (19 mmol) of dimethyl terephthalate were used instead of succinic acid, the content of isosorbide was changed from 3.2 g (22 mmol) to 1.54 g (10.56 mmol), 1.03 g (11.44 mmol) of 1,4-butanediol was additionally used and methanol rather than water was generated as a by-product, a polyester resin was prepared in the same manner as in Comparative Example 1, and the number average molecular weight, impact strength and heat resistance (Tg) of the prepared polyester resin were measured and shown in Table 1 below.

<Physical Property Evaluation>

(1) Number Average Molecular Weight (Mn: g/mol)

The number average molecular weight of the polyester resin was measured under a temperature condition of 40° C. and a flow rate of 1 ml/min using a gel permeation chromatography (Waters 2690, PL) (standard: polystyrene)

(2) Glass Transition Temperature (Heat Resistance: ° C.)

The polyester resin was annealed at 300° C. for 5 minutes, and cooled to room temperature, and then the glass transition temperature (Tg) at the time of scanning again at a heating rate of 10° C./min was measured.

(3) Impact Strength (Kgfcm/cm)

A 3.2 mm-thick specimen was prepared using a polyester resin, and impact strength was measured at a temperature of 25° C. using an impact tester (RESIL IMPACTOR, CEAST) according to ASTM D256.

(4) Eco-Friendliness

Based on the total weight of the monomer constituting the polyester resin, the content (% by weight) of the component derived from biomass was calculated.

<Ingredient>

DMS: dimethyl succinate (a biomass-derived component)

DMT: dimethyl terephthalate

SA: Succinic acid (a biomass-derived component)

TA: terephthalic acid

ISB: isosorbide (a biomass-derived component)

1,4-BDO: 1,4-butanediol

The molar contents of DMS, DMT, SA and TA are based on 100 mol % of the total acid component, and the molar contents of ISB and 1,4-BDO are based on 100 mol % of the total diol component.

TABLE 1

|  |  | Example | | | | | | |
| --- | --- | --- | --- | --- | --- | --- | --- | --- |
| Categories |  | 1 | 2 | 3 | 4 | 5 | 6 | 7 |
| Component | DMS (mol %) | 10 | 5 | 5 | 5 | 14 | 1 | 10 |
|  | DMT (mol %) | 90 | 95 | 95 | 95 | 86 | 99 | 90 |
|  | ISB (mol %) | 100 | 100 | 77.3 | 90.9 | 100 | 100 | 50 |
|  | 1,4-BDO (mol %) | — | — | 22.7 | 9.1 | — | — | 50 |
| Properties | Mn (g/mol) | 22,500 | 22,800 | 23,100 | 22,900 | 21,900 | 23,400 | 22,700 |
|  | Tg (° C.) | 112 | 117 | 107 | 109 | 105 | 119 | 103 |
|  | Impact strength (Kgfcm/cm) | 12 | 11 | 15 | 14 | 14 | 11 | 17 |
|  | Eco-friendliness (wt %) | 50 | 47.5 | 37.8 | 43.1 | 51.9 | 45.7 | 29.7 |

|  |  | Comparative Example | | | | | | | |
| --- | --- | --- | --- | --- | --- | --- | --- | --- | --- |
| Categories |  | 1 | 2 | 3 | 4 | 5 | 6 | 7 | 8 |
| Component | DMS (mol %) | — | 100 | — | — | 20 | 15 | 10 | 5 |
|  | DMT (mol %) | — | — | 100 | — | 80 | 85 | 90 | 95 |
|  | SA (mol %) | 100 | — | — | 20 | — | — | — | — |
|  | TA (mol %) | — | — | — | 80 | — | — | — | — |
|  | ISB (mol %) | 100 | 100 | 100 | 100 | 100 | 100 | 45 | 48 |
|  | 1,4-BDO (mol %) | — | — | — | — | — | — | 55 | 52 |
| Properties | Mn (g/mol) | 9,800 | 21,200 | 23,800 | 7,000 | 21,400 | 22,500 | 21,900 | 22,900 |
|  | Tg (° C.) | 52 | 72 | 119 | 54 | 94 | 97 | 94 | 97 |
|  | Impact strength (Kgfcm/cm) | 4 | 14 | 5 | 4 | 15 | 16 | 18 | 17 |
|  | Eco-friendliness (wt %) | 100 | 100 | 45.1 | 57.8 | 55.1 | 52.5 | 27.6 | 26.3 |

As shown in Table 1, in Examples 1 to 7 according to the present invention, the polyester resin has a high molecular weight of a number average molecular weight (Mn) of 10,000 g/mol or more, and can realize excellent heat resistance and impact resistance at the same time since it exhibits a glass transition temperature (Tg) of 100° C. or higher and impact resistance of 11 Kgfcm/cm or more, and can be applied as an eco-friendly product.

However, in Comparative Examples 1 and 2, which did not comprise the diester component of the aromatic dicarboxylic acid, the glass transition temperature was less than 100° C. and the heat resistance was poor, and in particular, in Comparative Example 1, the number average molecular weight (Mn) was less than 10,000 g/mol and the impact strength was poor. In Comparative Example 3, which did not comprise the diester component of aliphatic dicarboxylic acid, the heat resistance was excellent, but the impact strength was poor.

In addition, in Comparative Example 4, which comprises an acid component derived from an aliphatic dicarboxylic acid and an aromatic dicarboxylic acid, the reactivity was lowered, and the number average molecular weight was less than 10,000 g/mol, so that a polyester resin having a high molecular weight could not be obtained, and both heat resistance and impact strength were poor. Even when both the diester of aliphatic dicarboxylic acid and the diester of aromatic dicarboxylic acid were comprised, in Comparative Examples 5 and 6 whose contents were out of a specific range, the glass transition temperature was less than 100° C. and the heat resistance was relatively poor. In Comparative Examples 7 and 8 in which the content of the anhydrosugar alcohol was less than a specific range, the heat resistance was relatively poor because the glass transition temperature was less than 100° C. and it was inappropriate for application to eco-friendly products.

The invention claimed is:

1. A polyester resin comprising a repeating unit derived from a diester component of a dicarboxylic acid; and a repeating unit derived from a diol component,
   wherein the diester component of the dicarboxylic acid comprises 1 to 14 mol % of a diester of an aliphatic dicarboxylic acid; and 86 to 99 mol % of a diester of an aromatic dicarboxylic acid, based on 100 mol % of the total diester component of the dicarboxylic acid,
   the diester of the aliphatic dicarboxylic acid comprises a succinic acid diester,
   the diol component comprises 50 to 100 mol % of an anhydrosugar alcohol, based on 100 mol % of the total diol component,
   the number average molecular weight (Mn) of the polyester resin is 10,000 g/mol or more, and
   wherein the polyester resin has a glass transition temperature (Tg) of 100° C. or higher, and an impact strength of 11 Kgfcm/cm or more when measured at 25° C. according to ASTM D256 standard.

2. The polyester resin according to claim 1, wherein the diester component of the aliphatic dicarboxylic acid further comprises a diester of an aliphatic dicarboxylic acid having 4 to 14 carbon atoms other than a succinic acid diester, and
   the diester component of the aromatic dicarboxylic acid comprises a diester of an aromatic dicarboxylic acid having 8 to 16 carbon atoms.

3. The polyester resin according to claim 2, wherein the diester component of aliphatic dicarboxylic acids other than a succinic acid diester is selected from the group consisting of cyclohexanedicarboxylic acid diester, sebacic acid diester, isodecylsuccinic acid diester, maleic acid diester, fumaric acid diester, adipic acid diester, glutaric acid diester, azelaic acid diester, itaconic acid diester, glutamic acid diester, 2,5-furandicarboxylic acid diester, tetrahydrofuran-2,5-dicarboxylic acid diester, tetrahydrofuran-3,5-dicarboxylic acid diester, undecanedioic acid diester, dodecanedioic acid diester, tridecanedioic acid diester, tetradecanedioic acid diester or a combination thereof; and
   the diester component of aromatic dicarboxylic acid is selected from the group consisting of phthalic acid diester, terephthalic acid diester, isophthalic acid diester, 2,6-naphthalenedicarboxylic acid diester, diphenic acid diester, p-phenylene diacetic acid diester, o-phenylene diacetic acid diester or combinations thereof.

4. The polyester resin according to claim 1, wherein the anhydrosugar alcohol is selected from the group consisting of isosorbide, isomannide, isoidide or mixtures thereof.

5. The polyester resin according to claim 1, wherein the diol component further comprises an aliphatic diol component other than anhydrosugar alcohol, and the content of the aliphatic diol components other than anhydrosugar alcohol is 50 mol % or less based on 100 mol % of the total diol component.

6. The polyester resin according to claim 5, wherein the aliphatic diol component other than anhydrosugar alcohol is selected from the group consisting of ethylene glycol, diethylene glycol, triethylene glycol, 1,2-propane diol, 1,3-propane diol, 1,2-butane diol, 1,3-butane diol, 1,4-butane diol, 1,2-pentane diol, 1,3-pentane diol, 1,4-pentane diol, 1,5-pentane diol, 1,2-hexane diol, 1,3-hexane diol, 1,4-hexane diol, 1,5-hexane diol, 1,6-hexane diol, neopentyl glycol, 1,2-cyclohexane diol, 1,3-cyclohexane diol, 1,4-cyclohexane diol, 1,2-cyclohexane dimethanol, 1,3-cyclohexane dimethanol, 1,4-cyclohexane dimethanol, tetramethylcyclobutane diol, tricyclodecane dimethanol, adamantanediol, 2,2-dimethyl-1,3-propane diol, 2-ethyl-2-t-butyl-1,3-propane diol, 2,2,4-trimethyl-1,6-hexane diol or combinations thereof.

7. The polyester resin according to claim 1, wherein the content of the raw material component derived from biomass comprising the anhydrosugar alcohol and the diester component of an aliphatic dicarboxylic acid is 28 to 70% by weight, based on the total weight of the monomers constituting the polyester resin.

8. The polyester resin according to claim 1, wherein the number average molecular weight (Mn) is 10,000 to 100,000 g/mol.

9. A method for preparing a polyester resin comprising
   (1) a step of esterification reaction or transesterification reaction of a diester component of a dicarboxylic acid comprising a diester of an aliphatic dicarboxylic acid and a diester of an aromatic dicarboxylic acid and a diol component comprising an anhydrosugar alcohol; and
   (2) a step of polycondensation reaction of the reaction product obtained in step (1),
   wherein the diester of the aliphatic dicarboxylic acid comprises a succinic acid diester,
   the diester component of the dicarboxylic acid comprises 1 to 14 mol % of the diester of the aliphatic dicarboxylic acid; and 86 to 99 mol % of the diester of the aromatic dicarboxylic acid, based on 100 mol % of the total diester component of the dicarboxylic acid,
   the diol component comprises 50 to 100 mol % of an anhydrosugar alcohol, based on 100 mol % of the total diol component,
   the number average molecular weight (Mn) of the polyester resin is 10,000 g/mol or more, and
   wherein the polyester resin has a glass transition temperature (Tg) of 100° C. or higher, and an impact strength of 11 Kgfcm/cm or more when measured at 25° C. according to ASTM D256 standard.

10. The method for preparing a polyester resin according to claim 9, wherein the diol component further comprises an aliphatic diol component other than anhydrosugar alcohol, and
    the content of the aliphatic diol components other than anhydrosugar alcohol is 50 mol % or less based on 100 mol % of the total diol component.

11. The method for preparing a polyester resin according to claim 9, wherein in step (1), the reaction molar ratio of the diol component to the diester component of the dicarboxylic acid (the total number of moles of the diol component/the total number of moles of the diester component of the dicarboxylic acid) is 1.0 to 1.5.

* * * * *